United States Patent
Fan et al.

(10) Patent No.: US 8,301,655 B2
(45) Date of Patent: Oct. 30, 2012

(54) WIRELESS SENSING SYSTEM AND METHOD THEREOF

(75) Inventors: Yao-Chung Fan, Kaohsiung (TW);
Arbee L. P. Chen, Taipei (TW);
Guan-Rong Lin, Yunlin County (TW);
Lun-Chia Kuo, Taichung (TW)

(73) Assignees: Industrial Technology Research Institute, Hsinchu (TW); National Chengchi University, Taipei (TW)

( * ) Notice: Subject to any disclaimer, the term of this patent is extended or adjusted under 35 U.S.C. 154(b) by 208 days.

(21) Appl. No.: 12/771,038

(22) Filed: Apr. 30, 2010

(65) Prior Publication Data

US 2011/0055280 A1    Mar. 3, 2011

(30) Foreign Application Priority Data

Aug. 27, 2009    (TW) .............................. 98128814 A

(51) Int. Cl.
*G06F 7/00* (2006.01)
*G06F 17/30* (2006.01)
(52) U.S. Cl. ...................... 707/770; 707/796; 707/802
(58) Field of Classification Search .................. None
See application file for complete search history.

(56) References Cited

U.S. PATENT DOCUMENTS

| | | |
|---|---|---|
| 7,302,362 B2 | 11/2007 | Misra et al. |
| 7,496,477 B2 | 2/2009 | Misra et al. |
| 2006/0167634 A1 | 7/2006 | Cho et al. |
| 2008/0052041 A1 | 2/2008 | Misra et al. |

FOREIGN PATENT DOCUMENTS

| | | |
|---|---|---|
| TW | I275294 | 3/2007 |
| TW | 200801872 | 1/2008 |

OTHER PUBLICATIONS

Fan et al., "Efficient and Robust Schemes for Sensor Data Aggregation Using Linear Count Sketches", IEEE International Symposium on Parallel and Distributed Processing, pp. 1-12, Apr. 2008, IEEE.*
English language translation of abstract of TW 200801872 (published Jan. 1, 2008).
English language translation of abstract of TW I275294.
Considine, J., et al.; "Approximate Aggregation Techniques for Sensor Databases;" pp. 1-12 (published between Mar. 30, 2004 and Apr. 2, 2004).
Chen, J.Y., et al.; "Robust Computation of Aggregates in Wireless Sensor Networks: Distributed Randomized Algorithms and Analysis;" IEEE; 2005; pp. 1-8.
Fan, Y.C., et al.; "Efficient and Robust Schemes for Sensor Data Aggregation Based on Linear Counting;" IEEE Transactions on Journal Name; pp. 1-14.

(Continued)

*Primary Examiner* — Michael Hicks
(74) *Attorney, Agent, or Firm* — Thomas|Kayden

(57) ABSTRACT

A wireless sensing system and a method thereof are provided. The wireless sensing system includes: a data processing center; and a first sensor module for processing a first source data into a first dynamic counting sketch data structure. The first dynamic counting sketch data structure has a bit length determined based on the first source data. The data processing center estimates the first source data based on the first dynamic counting sketch data.

16 Claims, 5 Drawing Sheets

OTHER PUBLICATIONS

He, W., et al.; "PDA: Privacy-Preserving Data Aggregation in Wireless Sensor Networks;" pp. 1-9 (published between May 6, 2007 and May 12, 2007).

Fan, Y.C., et al.; "Efficient and Robust Sensor Data Aggregation Using Linear Counting Sketches;" IEEE; 2008; pp. 1-12.

Intel Lab Data; http://db.csail.mit.edu/labdata/labdata.html; Feb. 2004-Apr. 2004; pp. 1-2.

Manjhi, A., et al.; "Tributaries and Deltas: Efficient and Robust Aggregation in Sensor Network Streams;" Proceedings of the 2005 ACM SIGMOD International Conference on Management of Data; 2005; pp. 1-17.

Nath, S., et al.; "Synopsis Diffusion for Robust Aggregation in Sensor Networks;" Proceedings of the 2nd International Conference on Embedded Networked Sensor Systems; 2004; pp. 250-262.

* cited by examiner

WIRELESS SENSING SYSTEM AND METHOD THEREOF

This application claims the benefit of Taiwan application Serial No. 98128814, filed Aug. 27, 2009, the subject matter of which is incorporated herein by reference.

TECHNICAL FIELD

The present disclosure relates in general to a network sensing system and a method thereof.

BACKGROUND

Wireless sensing systems may be applied outdoors or indoors. The outdoor applications include the forest ecology monitoring and the like. The indoor applications include, for example, the detection of the concentration of carbon dioxide in the factory, the indoor temperature monitoring, and the like. A wireless sensor in the wireless sensing system senses, collects and sends back the data.

At present, the user may perform the data aggregation query on the wireless sensing system, for example, the sum, average, counting, histogram and maximum of the sensed data. The common applications of the data aggregation query include, for example, querying the average gas consumption in a certain zone, querying the number of the active sensor nodes in the wireless sensing system or the maximum rainfall in a zone.

At present, the well-known data aggregation method in the wireless sensor system is the tree-based data aggregation computation. A spanning tree is constructed with respect to the wireless sensing system, wherein one of the wireless sensors (i.e. nodes) serves as a root node, and other wireless sensors serve as internal nodes. For example, in the computation of sum aggregation, the bottommost layer of sensor nodes sends (or broadcasts) their sensed readings to the upper layer of sensor nodes. Each sensor node sums the sensed readings transferred from all the child nodes and its own sensed readings to calculate the new partial aggregated value, which is then sent to the parent node. Thus, the operation is performed level by level (or node by node), and a final aggregate is finally calculated at the root node.

In addition, in order to enhance the reliability and the fault-tolerance ability, the multi-path data aggregation computation is applied to the sensing data aggregation computation of the wireless sensing system. In the multi-path data aggregation computation, a directed acyclic graph is used to connect each sensor node of the wireless sensing system. In the multi-path data aggregation computation, the sensor node broadcasts its own sensed reading to all nodes on the upper layer. Because one sensed reading is copied into multiple copies and transferred and calculated in the network, the sensed reading of the sensor node cannot be lost until all the copies are lost. So, its reliability is better. In the multi-path data aggregation computation, however, the same data may be calculated repeatedly so that the double counting problem is induced and the result of data aggregation query may be incorrect.

Thus, the example embodiment of the present disclosure discloses a wireless sensing system and a method thereof, capable of performing the multi-path based data aggregation computation based on the dynamic counting.

BRIEF SUMMARY

According to a first example of the present disclosure, a wireless sensing system including a data processing center and a first sensor module is provided. The first sensor module processes first source data into a first dynamic counting sketch data structure whose size determined based on the first source data. The data processing center estimates the first source data at least based on the first dynamic counting sketch data, directly or indirectly.

According to a second example of the present disclosure, a wireless sensing method applied to a wireless sensing system is provided. The wireless sensing method includes the steps of: receiving a user instruction; sensing a first source data and a second source data; processing the first source data and the second source data into a first dynamic counting sketch data structure and a second dynamic counting sketch data structure, respectively, wherein respective bit-length of the first dynamic counting sketch data structure and the second dynamic counting sketch data structure are determined based on the first and the second source data, respectively; performing an in-network aggregation computation on the first and the second dynamic counting sketch data structures to generate a third dynamic counting sketch data structure; generating a final dynamic counting sketch data structure layer by layer; and estimating the first source data, the second source data and other source data related to other layers according to the final dynamic counting sketch data structure.

It is to be understood that both the foregoing general description and the following detailed description are exemplary and explanatory only and are not restrictive of the disclosed embodiments, as claimed.

DETAILED DESCRIPTION OF EXEMPLARY EMBODIMENT OF THE PRESENT DISCLOSURE

First Embodiment

Figure 1A:
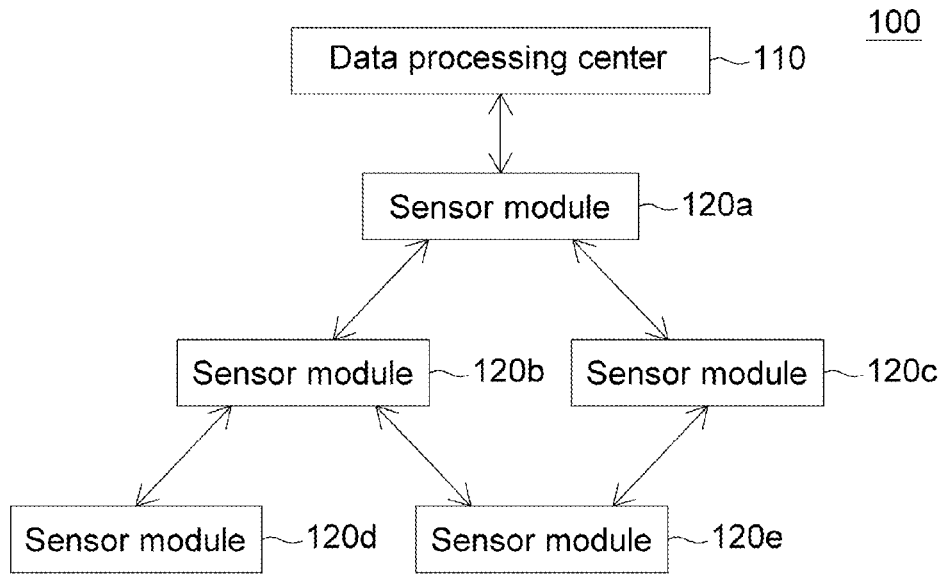
FIG. 1A is a schematic illustration showing a wireless sensing system according to a first embodiment of the present disclosure.
Figure 1B:
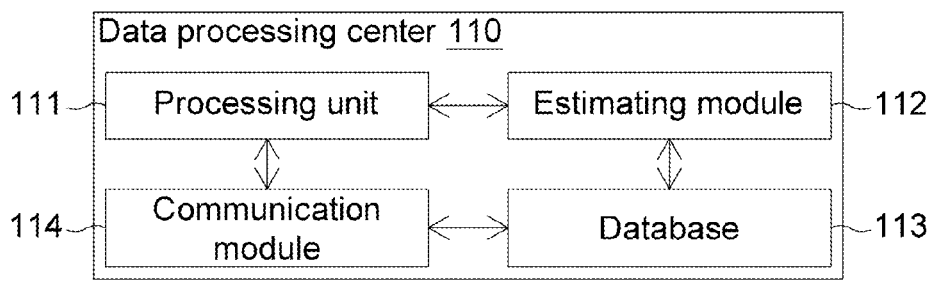
FIG. 1B is a schematic illustration showing a data processing center according to the first embodiment of the present disclosure.
Figure 1C:
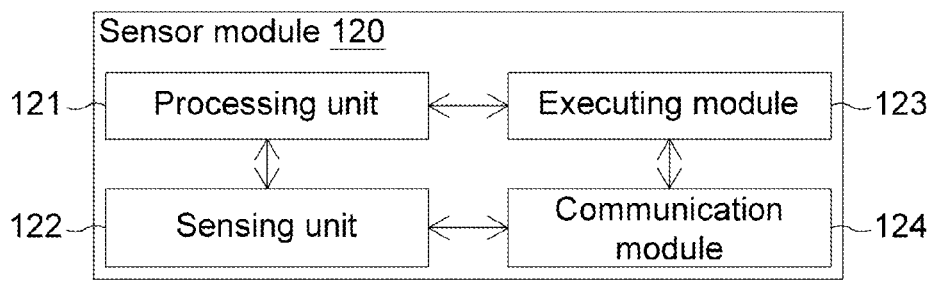
FIG. 1C is a schematic illustration showing a sensor module according to the first embodiment of the present disclosure.

FIG. 1A is a schematic illustration showing a wireless sensing system according to a first embodiment of the present disclosure. FIG. 1B is a schematic illustration showing a data processing center applied to the first embodiment of the present disclosure. FIG. 1C is a schematic illustration showing a sensor module applied to the first embodiment of the present disclosure.

Referring to FIG. 1A, the wireless sensing system 100 according to the first embodiment of the present disclosure includes a data processing center 110 and multiple sensor modules 120, which include, for example but without limitation to, sensor modules 120a to 120e. Referring to FIG. 1B, the data processing center 110 includes a processing unit 111, an estimating module 112, a database 113 and a communication module 114. Referring to FIG. 1C, the sensor module 120 includes a processing unit 121, a sensing unit 122, an executing module 123 and a communication module 124. In this specification, the sensor module, the node and the sensing node represent almost the same or equivalent meaning.

The sensor module 120 collects (i.e. senses) data according to the instruction from the data processing center 110, and transfers data back to the data processing center 110. The data processing center 110 receives the data transferred from the sensor module 120 and then estimates the aggregated data and reports to the user.

The processing unit 111 performs the local computing and analyzes data. The estimating module 112 estimates according to data transferred from the sensor module 120. The database 113 stores data collected by the sensor module 120. The communication module 114 receives and transmits data between the sensor module 120 and the data processing center 110.

The processing unit 121 performs the local computing, such as, the instruction analyzing, and the like. The processing unit 121 has the basic computing power, determines the sensing period and the sensing path and controls the sensing unit 122 to send the sensed result back to the data processing center 110 through the communication module 124.

The sensing unit 122 is controlled by the processing unit 121 and the executing module 123. The sensing unit 122 senses the environment to obtain sensed data. The data collected by the sensing unit 122 is sent to the data processing center 110 through the communication module 124. The sensing unit 122 may be a multi-attribute sensor for sensing various environment variables such as temperature, humidity, luminance, pressure, gas concentration and the like.

The executing module 123 analyzes the instruction transferred from the data processing center 110. The communication module 124 receives and transmits data between the data processing center 110 and the sensor module 120.

For the sake of convenience, it is assumed that all the sensor modules 120 in the wireless sensing system 100 participate the data aggregation computation (i.e., all the sensor modules 120 have to sense data and send the data back). In this embodiment, the multi-path topology is applied. That is, the sensor module in bottom layers uploads data to all the upper sensor modules, and the upper sensor module aggregates its own sensed data with the received data. As shown in FIG. 1A, for example, the sensor module 120e sends its sensed data to the sensor modules 120b and 120c. The sensor module 120b aggregates its own sensed data and the sensed data from the sensor module 120e and broadcasts the aggregated data upwards to its upper sensor module 120a. The uppermost sensor module (120a), also referred to as a root node, aggregates its own sensed data with all data and sends the aggregated data to the data processing center 110.

Figure 2:
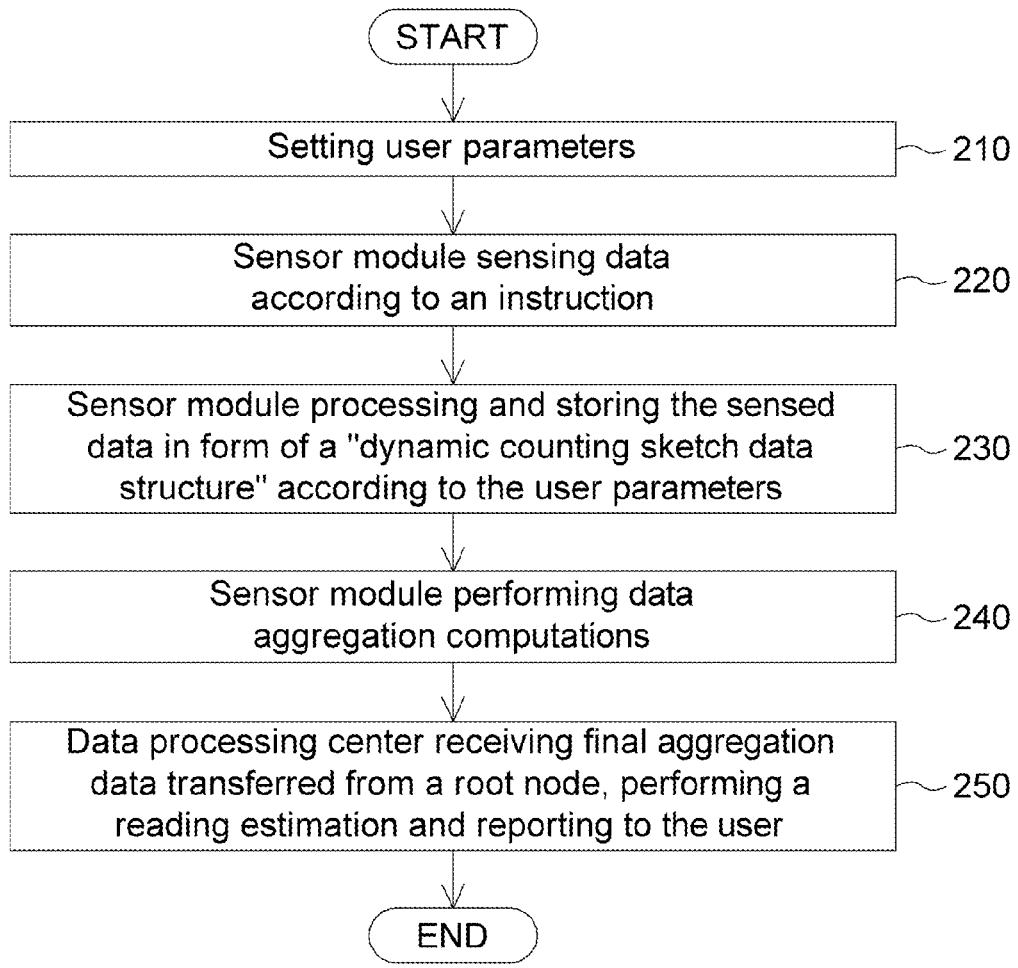
FIG. 2 is a flow chart showing operations of the wireless sensing system according to the first embodiment of the present disclosure.

FIG. 2 is a flow chart showing operations of the wireless sensing system according to the first embodiment of the present disclosure. As shown in FIG. 2, the user sets parameters in step 210. For example, the user may set the parameters through the data processing center 110. The user parameters include, for example but without limitation to, the data aggregation function, the data aggregation precision requirement, including the error tolerance and the confidence level, the privacy protection requirement and the like. The data aggregation function indicates at least one data attribute and a query kind, wherein the data attribute is the sensing attribute of the sensor, and the query kind is the aggregation query, such as the average query, the sum query, the counting query, the maximum query or the like. The privacy protection requirement is a selective option, which determines whether data collected by the sensor module is under the privacy protection or not.

In step 220, the sensor module senses data according to the instruction, the instruction designating the clock (i.e., the sensing cycle, the sensing frequency, or the like), for example. In step 230, the sensor module stores the sensed reading in form of the "dynamic counting sketch data structure" according to the user parameters, wherein the details of dynamic counting sketch data structure will be described in the following. In step 240, the sensor module performs the data aggregation computation to aggregate its own sensed reading (in the form of the dynamic counting sketch data structure) with the received aggregation data (also in the form of the dynamic counting sketch data structure) from the bottom layer sensor module, if any. The details thereof will be described in the following. In step 250, the data processing center receives the aggregation data transferred from the root node, performs estimation, and reports to the user.

Dynamic Counting Sketch Data Structure

In this embodiment, the executing module 123 in the sensor module 120 represents the data sensed thereby in form of the dynamic counting sketch data structure. The dynamic counting sketch data structure has a variable length, which relates to the sensed data. In this embodiment, the storage space required for storing the dynamic counting sketch data structure is dynamically allocated because the length of the dynamic counting sketch data structure is dynamically variable.

In this embodiment, the dynamic counting sketch data structure DC(BI, CV) includes a border index BI and a counting vector CV. The border index indicates the length (i.e., the index position) of the counting vector of the sensor node. The counting vector is a bit vector in which at most x elements are randomly and uniformly set as 1, x being the reading of the sensed data of the sensor module.

Figure 3A:
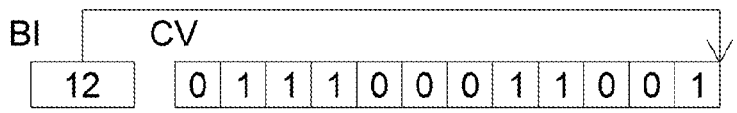
FIGS. 3A and 3B show the dynamic counting sketch data structures DC(BI, CV) according to the first embodiment of the present disclosure.
Figure 3B:
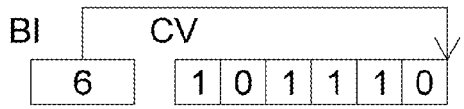

Assuming that the sensed data of two sensing modules are respectively 8 and 4, its dynamic counting sketch data structures DC(BI, CV) may be respectively represented as those shown in FIGS. 3A and 3B.

For the $i^{th}$ node involved in the data aggregation, according to the sensed reading $v_i$, the length $m_i$ of the counting vector may be represented as the following Equation (1):

$$m_i = \left\lceil \frac{v_i \cdot L(k, \varepsilon, \delta)}{5(e^t - t - 1)} \right\rceil \cdot 5(e^t - t - 1) \quad (1)$$

wherein, $\varepsilon$ represents the relative error ratio, which is a user parameter, $(1-\delta)$ represents the confidence level, which is also a user parameter, $t = k/L(k, \varepsilon, \delta)$, $L(k, \varepsilon, \delta) = k/\ln(2 \cdot k \cdot \varepsilon \cdot \delta + 2)$, and k represents the number of the sensing modules in the sensing network.

Data Aggregation Computation

In this embodiment, the executing module 123 in the sensor module 120 aggregates its own sensed reading (represented in the form of the dynamic counting sketch data structure) and the received aggregation data (also in the form of the dynamic counting sketch data structure) from the lower layer sensor modules. That is, data transferred from the lower layer sensor module to the upper layer sensor module in this embodiment is also represented in the form of the dynamic counting sketch data structure.

Next, how the aggregation computation on the dynamic counting sketch data structure in this embodiment is performed will be described. The sensor node in the bottommost layer of the wireless sensing system broadcasts its own dynamic counting sketch data structure to all the upper layer nodes. After receiving the dynamic counting sketch data structure from the bottom layer, the upper layer node performs the in-network aggregation computation on its own dynamic counting sketch data structure and the received dynamic counting sketch data structure.

In aggregating two dynamic counting sketch data structures, the aggregation computation is performed in the following. Two dynamic counting sketch data structures $DC_1$ ($BI_1$, $CV_1$) and $DC_2$($BI_2$, $CV_2$) are given, $|CV_2| \geq |CV_1|$. In this case, the sum $DC_3$($BI_3$, $CV_3$) of $DC_1$ and $DC_2$ is represented as follows:

$$BI_3 = BI_1 \cup BI_2 \quad (2)$$

$$CV_3[i] = (CV_1[i]) \vee (CV_2[i]), i=0, \ldots, |CV_1|-1 \quad (3)$$

$$CV_3[i] = CV_2[i], = |CV_1|, \ldots, |CV_2|-1 \quad (4)$$

wherein $\cup$ represents the union, and $\vee$ represents the logic OR.

Figure 4:
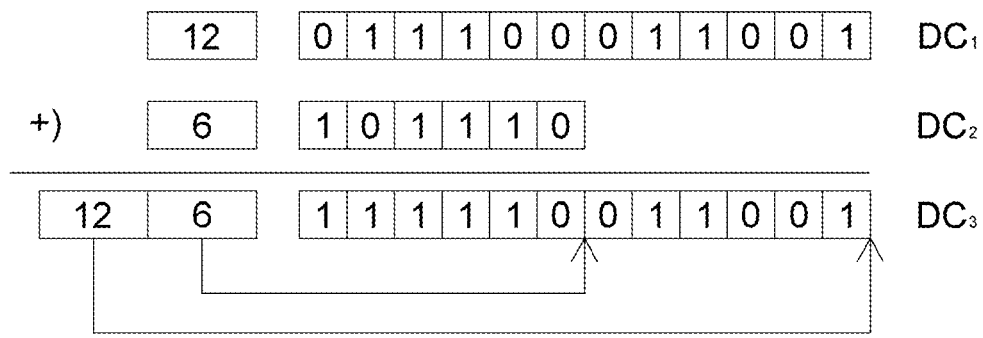
FIG. 4 shows the data aggregation computation according to the first embodiment of the present disclosure.

It is assumed that the sensed data $DC_1$($BI_1$, $CV_1$) of a certain sensor module may be represented as FIG. 3A (i.e., the reading thereof is 8) and the data structure $DC_2$($BI_2$, $CV_2$) transferred from the lower layer sensor module may be represented as FIG. 3B (i.e., the reading thereof is 4), then the data aggregation computation performed by the sensor module is shown in FIG. 4.

The sensor module transfers the aggregated dynamic counting sketch data structure to its upper layer nodes until all the dynamic counting sketch data structures are aggregated at the root node. That is, the root node produces the final dynamic counting sketch data structure.

Data Estimation

After all the dynamic counting sketch data structures have been aggregated at the root node, the root node aggregates all the dynamic counting sketch data structures to generate a final dynamic counting sketch data structure $DC_{final}$, which is represented as Equation (5):

$$DC_{final} = \sum_{i=1}^{k} DC_i \quad (5)$$

wherein k represents the number of sensing modules in the network.

According to the border index and the counting vector of the final dynamic counting sketch data structure, the estimating module of the data processing center may estimate the final result according to the following dynamic counting estimation equation (6):

$$\hat{n} = \sum_{i=1}^{max} \hat{v}_i = -BI_{max} \ln(V'_{m_{max}}) - \sum_{i=1}^{max-1} BI_i \ln(V'_{m_i} / V'_{m_{i+1}}) \quad (6)$$

wherein $\hat{n}$ represents the estimated final result, $\hat{v}_i$ represents the estimated result of the dynamic counting sketch data structure of each sensor module, "max" represents the maximum length in all the dynamic counting sketch data structure, and $V_i'$ represents the ratio of bit 0 of each zone i of the final dynamic counting sketch data structure $DC_{final}$.

Figure 5:
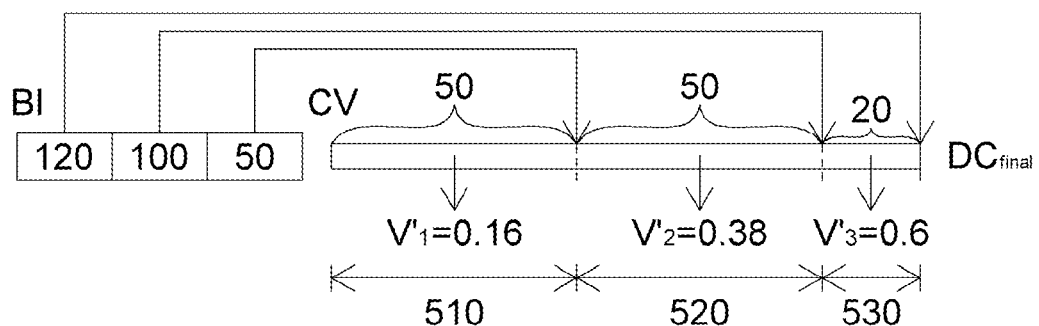
FIG. 5 shows an example of a final dynamic counting sketch data structure $DC_{final}$ according to the first embodiment of the present disclosure.

FIG. 5 shows an example of the final dynamic counting sketch data structure $DC_{final}$ according to the first embodiment of the present disclosure. Referring to FIG. 5, the final dynamic counting sketch data structure $DC_{final}$ includes 120 bits and is obtained by aggregating three dynamic counting sketch data structures $DC_1$ to $DC_3$. It is assumed that BI of $DC_1$ is 50; BI of $DC_2$ is 100; and BI of $DC_3$ is 120. The $1^{st}$ to $50^{th}$ bits of the final dynamic counting sketch data structure $DC_{final}$ represent the zone 510; the $51^{st}$ to $100^{th}$ bits represent the zone 520; and the $101^{st}$ to $120^{th}$ bits represent the zone 530. $V_1$ represents the ratio of logic 0 bit in the zone 510; $V_2$ represents the ratio of bit 0 in the zone 520; $V_3$ represents the ratio of bit 0 in the zone 530. In the example of FIG. 5, when $V_1 = 0.16$, its represents that there are 8 (50*0.16=8) logic 0 bits in the zone 510, and so on.

The bits in the zone 530 come directly from the $101^{st}$ to $120^{th}$ bits of the dynamic counting sketch data structure $DC_3$, so the ratio $V_3$ of logic 0 bit in the zone 530 is the ratio of bit 0 of the dynamic counting sketch data structure $DC_3$. It is possible to derive the ratio of bit 0 of the dynamic counting sketch data structure $DC_3$ as 0.6. After the ratio of bit 0 of the dynamic counting sketch data structure $DC_3$ is derived, it is possible to derive the ratio of bit 1 of the dynamic counting sketch data structure $DC_3$. That is, it is possible to derive the number of bit 1 of the dynamic counting sketch data structure $DC_3$. In the dynamic counting sketch data structure, bits 1 are randomly distributed in the bit vector according to the sensed data. So, the number of bits 1 relates to (reflects) the sensed data, and the reading of the sensed data may be derived once the number of bits 1 is known.

All the bits in the zone 520 come from the sums (logic OR) of the $51^{st}$ to $100^{th}$ bits of the dynamic counting sketch data structure $DC_2$ and the $51^{st}$ to $100^{th}$ bits of the dynamic counting sketch data structure $DC_3$. Thus, the ratio $V_2$ of bit 0 in the zone 520 is the product of the ratio of bit 0 of the dynamic counting sketch data structure $DC_2$ and the ratio (i.e., $V_3$) of bit 0 of the dynamic counting sketch data structure $DC_3$. The ratio of bit 0 of the dynamic counting sketch data structure $DC_2$ may be derived as 0.38/0.6.

All the bits in the zone 510 come from the sums (logic OR) of the $1^{st}$ to $50^{th}$ bits of the dynamic counting sketch data structure $DC_1$, the $1^{st}$ to $50^{th}$ bits of the dynamic counting sketch data structure $DC_2$ and the $1^{st}$ to $50^{th}$ bits of the dynamic counting sketch data structure $DC_3$. Thus, the ratio $V_1$ of bit 0 in the zone 510 is the product of the ratio of bit 0 of the dynamic counting sketch data structure $DC_1$, the ratio of bit 0 of the dynamic counting sketch data structure $DC_2$ and the ratio of bit 0 of the dynamic counting sketch data structure $DC_3$. It is possible to derive the ratio of bit 0 of the dynamic counting sketch data structure $DC_1$ as 0.16/0.38.

Substituting each of the readings of V' of FIG. 5 into Equation (6), the final result may be derived as the following Equation (7):

$$\begin{aligned} \hat{n} &= -BI_3 * \ln(V'_3) - BI_2 * \ln(V'_2/V'_3) - BI_1 * \ln(V'_1/V'_2) \quad (7) \\ &= -120\ln(0.6) - 100\ln(0.38/0.6) - 50\ln(0.16/0.38) \\ &= 150 \end{aligned}$$

The estimating module transfers the final result back to the user who commands the query. Thus, the data aggregation computation is completed. Based on the additive property in this embodiment, the user can perform the data aggregation query having the additive properties, such as the average, the sum and the like, according to this embodiment.

Figure 6A:
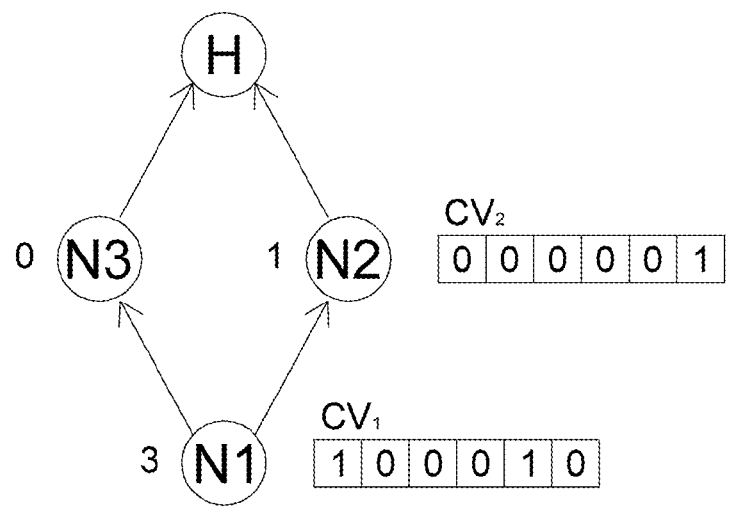
FIGS. 6A to 6C show the data aggregation processes according to the first embodiment of the present disclosure.
Figure 6B:
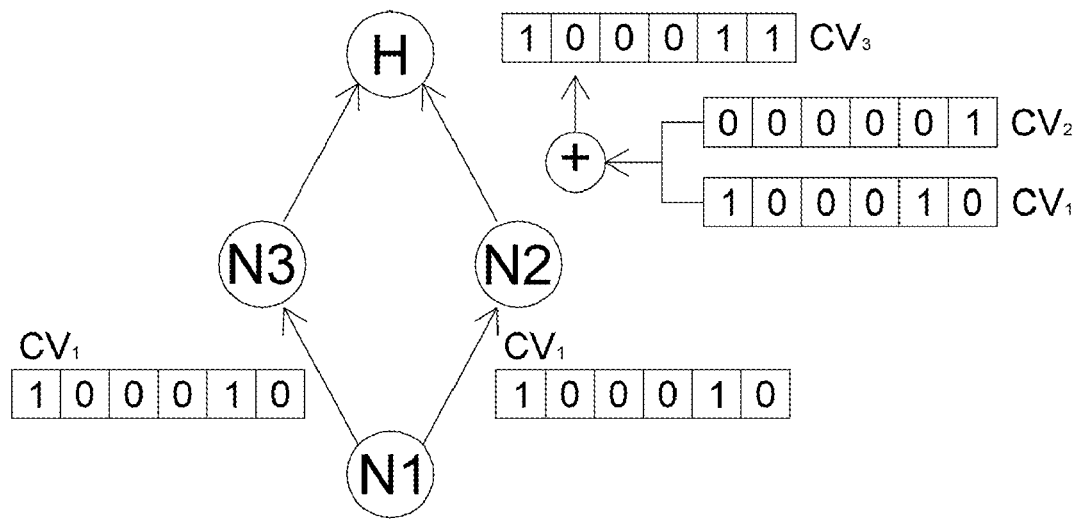
Figure 6C:
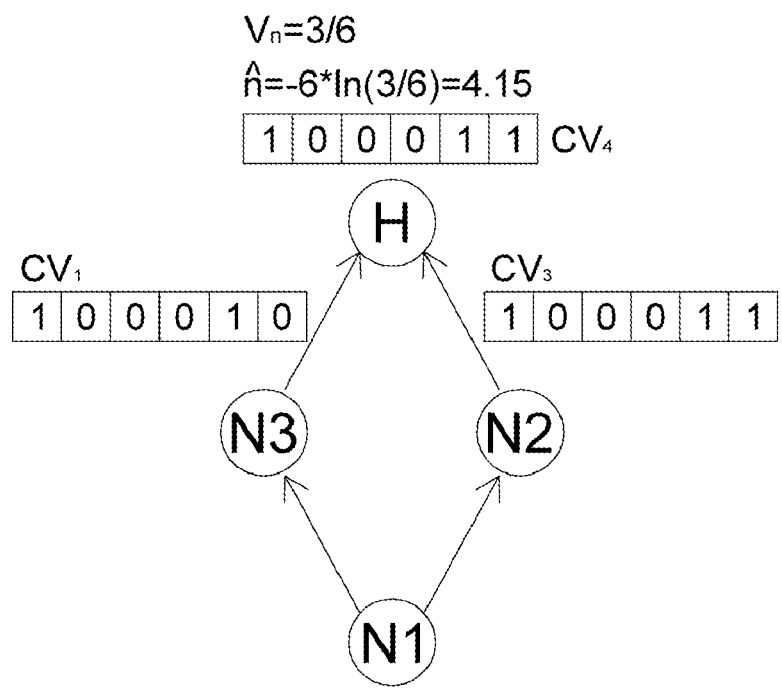

FIGS. 6A to 6C show the data aggregation processes according to the first embodiment of the present disclosure, wherein H represents the root node, and N1 to N3 represent three sensor modules. It is assumed that the sensed data of the sensor modules N1 to N3 are respectively 3, 1 and 0. As shown in FIG. 6A, the sensed data 3 and 1 of the sensor modules N1 and N2 may be respectively represented as the counting vectors $CV_1$ and $CV_2$ in the dynamic counting sketch data structure. For the sake of simplicity, the border index BI is omitted but the border index BI is also transferred between the nodes.

In FIG. 6B, the sensor module N1 broadcasts the counting vector $CV_1$ to the upper layer sensor modules N2 and N3. After the sensor module N2 receives the counting vector $CV_1$, it performs the data aggregation computation (addition) on the counting vectors $CV_1$ and $CV_2$ to obtain the counting vector $CV_3$. That is, in this embodiment, the lower layer sensor module (referred to as a child node) may have more than one upper layer sensor module (referred to as a father node), and transmit its own sensed data to all the father nodes.

In FIG. 6C, the sensor modules N2 and N3 respectively broadcast the counting vectors $CV_3$ and $CV_1$ to the root node H. After the root node H receives the counting vectors $CV_3$ and $CV_1$, it performs the data aggregation computation (addition) on the counting vectors $CV_3$ and $CV_1$ to obtain the counting vector $CV_4$. As discussed above, the root node can estimate the final result to be about 4.15. In fact, the sum of the readings of three sensor modules is 4 (3+1+0=4). Thus, it is known that the estimated (predicted) result according to this embodiment approximates the actual sum.

Even if the connection between the sensor modules N1 and N3 or the connection between the sensor module N3 and the root node H is interrupted, the counting vector $CV_3$ received by the root node H is still the same as $CV_3$ shown in FIG. 6C. If the counting vector $CV_1$ is 0 (or the counting vector $CV_1$ is not received), the counting vector $CV_4$ obtained by aggregating $CV_3$ and $CV_1$ is still the same as the counting vector $CV_4$ shown in FIG. 6C. That is, in this case, the final result is still not affected by the interruption of the connection between the sensor modules N1 and N3 (or the connection between the sensor module N3 and the root node H). In addition, even if the connection between the sensor modules N1 and N2 is interrupted, the counting vector $CV_1$ received by the root node H is still the same as the $CV_1$ shown in FIG. 6C, and the sensor module N2 transfers the counting vector $CV_2$ to the root node H. The counting vector $CV_4$ obtained by aggregating $CV_1$ and $CV_2$ is still the same as $CV_4$ shown in FIG. 6C. That is, in this case, the final result still is not affected by the interruption of the connection between the sensor modules N1 and N2.

The first embodiment is described according to the additive data aggregation computation. However, those skilled in the art may easily understand that the extension based on the additive method is not limited thereto. The data aggregation method according to the embodiment of the present disclosure is not only limited by two layers. Even after aggregation, in the embodiment, each data collected by each node may also be reproduced (estimated) because the process of aggregation is known. In addition, in the wireless sensing system, if the sensed data of one or more sensor modules is not desired, then the sensor module or these sensor modules does not sense, or does not to broadcast the sensed data or only relay the partial aggregates from lower layers.

Second Embodiment—Privacy Protection

Most of the sensor data aggregation technology aims at the outdoor data collection and the science application. Thus, the privacy protection of the sensor data is not the key point to be considered. However, when the wireless sensing system is applied to the daily application or the community management, the sensed data may involve sensitive personal privacy or safety consideration. However, the system manager may still need the data aggregated from the sensors for the resource programming or energy conservation. Therefore, the second embodiment of the present disclosure proposes the aggregation query process of the sensed data with considering the privacy of the sensed data.

Figure 7:
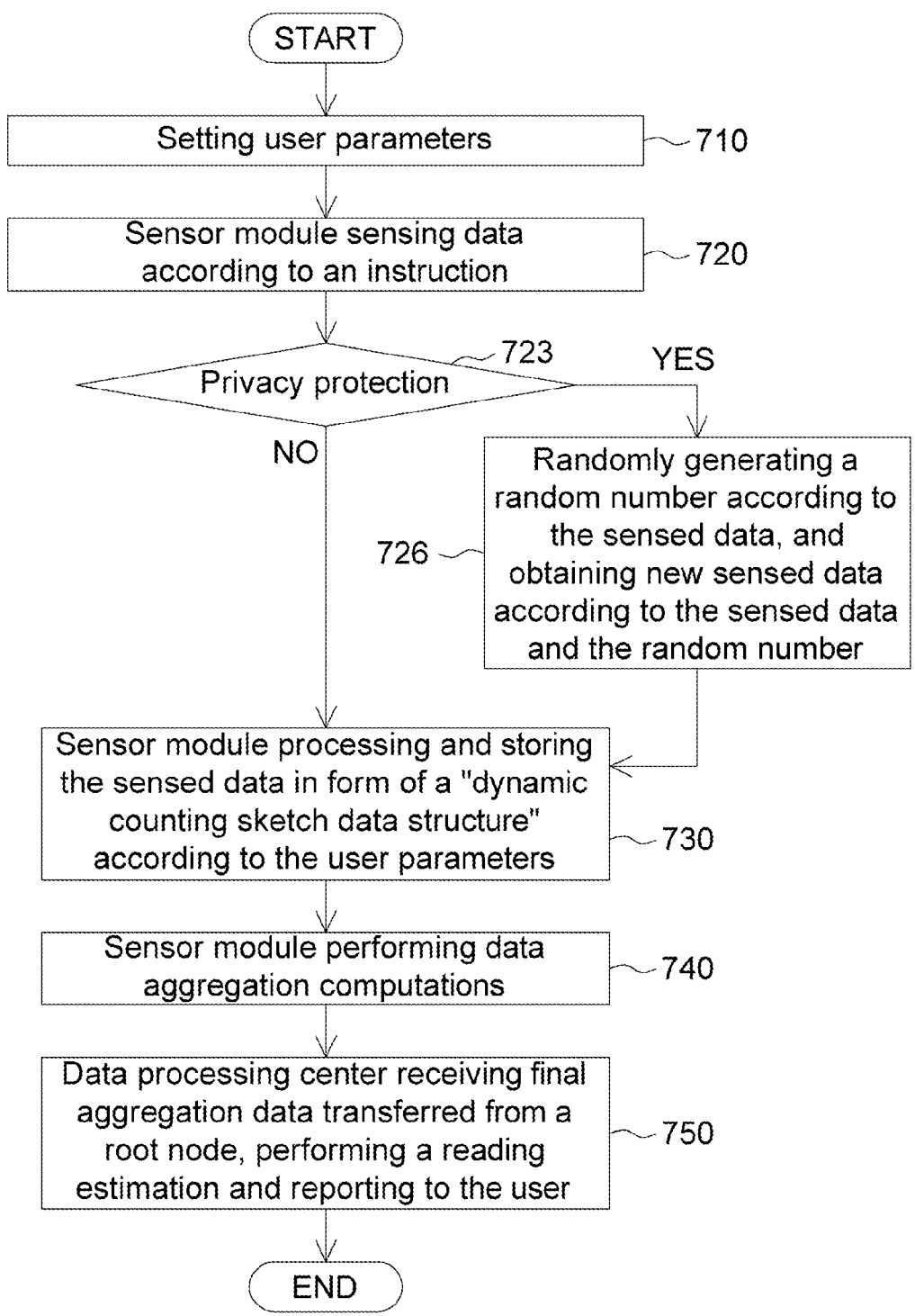
FIG. 7 is a flow chart showing operations of a wireless sensing system according to a second embodiment of the present disclosure.

FIG. 7 is a flow chart showing operations of a wireless sensing system according to a second embodiment of the present disclosure. As shown in FIG. 7, the step 710 is basically the same as the step 720 or similar to the steps 210 and 220 in FIG. 2, so detailed descriptions thereof will be omitted.

In step 723, it is determined whether to perform the privacy protection on the sensed data according to the parameters set by the user in the step 710. If yes, the procedure goes to step 726; or otherwise the procedure goes to step 730.

In the step 726, a random number is randomly generated according to the sensed data, and a new sensed data is obtained according to the random number and the original sensed data. The details thereof will be described in the following. So, the sensor module of the second embodiment further includes a random number generating unit.

In the step 730, the sensor module stores the sensed reading in the form of the "dynamic counting sketch data structure" according to the user parameters, wherein the originally sensed data is stored if the privacy protection is not enabled, and the new sensed data is stored when the privacy protection is enabled. The steps 740 and 750 are the same as or similar to the steps 240 and 250, so details thereof will be omitted.

When the random number is randomly generated, it is assumed that the sensed data d sensed by the $i^{th}$ sensor module is represented as $V_i$, and its associated random number is $r_i$ and is uniformly derived from the $[0, V_i]$ zone. So, the new sensed data $V_i''=V_i+r_i$. That is, the data (and the data structure thereof) broadcast from the lower layer sensor module to the upper layer sensor module is no longer the original sensed data, because the new sensed data containing the random number. Thus, even if the new sensed data containing the random number is obtained by an unauthorized user, the unauthorized user cannot recover the originally sensed data from the new sensed data due to the random number is unknown to the unauthorized user. Thus, the privacy protection on the originally sensed data is improved.

In addition, because the new sensed data includes the random number, the length of the counting vector may be represented by the following Equation (8):

$$m_i = \left\lceil \frac{\text{Max}(k*(v_i+r)/t, G(k*(v_i+r), \varepsilon_{new}, \delta))}{5*e^t/t} \right\rceil * 5*e^t/t, \quad (8)$$

wherein the definition of each parameter may be obtained from Equation (1). Substituting the random number into the above-mentioned equation, the error which may be caused by the random number may be dynamically adjusted. In addition, it is possible or almost possible to assure that the correctness of the aggregation result of the originally sensed data will satisfy the user's error tolerance according to the error tolerance and the confidence level set by the user.

The data aggregation computation of the second embodiment may be the same as or similar to that of the first embodiment, so detailed descriptions thereof will be omitted.

Finally, when the estimating module reports the result to the user, the random number has to be removed. Let the data aggregation result on all new sensed data Vi" be n', and n' may be represented by the following Equation (9):

$$n' = \sum_{i=1}^{k} Vi'' = n + E\left(\sum_{i=1}^{k} ri\right), \quad (9)$$

wherein n represents the estimated data aggregation result of the originally sensed data Vi (i.e., the reading to be reported to the user), while $$E\left(\sum_{i=1}^{k} ri\right)$$

represents the expected values of all the random numbers ri.

Because the random numbers are independent from each other, $$E\left(\sum_{i=1}^{k} ri\right)$$

may be represented by the following Equation (10):

$$E\left(\sum_{i=1}^{k} ri\right) = \sum_{i=1}^{k} E(ri) \quad (10)$$

Because the random numbers are randomly and uniformly derived from the [0,Vi] zone, the Equation (10) may be represented as the following Equation (11):

$$\sum_{i=1}^{k} E(ri) = \sum_{i=1}^{k} \frac{Vi - 0}{2} = \frac{n}{2}. \quad (11)$$

Substituting Equation (11) into the Equation (9) may obtain:

$$n' = n + n/2 \quad (12).$$

That is, n may be represented as follows:

$$n = 0.66n' \quad (13)$$

Thus, the estimating module may report the value n to the user according to Equation (13).

In addition, not all the originally sensed data are subject to the privacy protection in some cases according to the second embodiment of the present disclosure. That is, one or some sensed data may include the random numbers while other sensed data do not include the random number. In the data aggregation computation, the calculations on the sensed data including the random numbers and the sensed data without the random number may be performed in one equation.

In summary, the wireless sensing system and the method thereof according to the embodiments of the present disclosure have many technological characteristics.

First, the dynamic sketch data structure with the variable length is obtained. In the above-mentioned embodiments, the length of the dynamic counting sketch data structure (i.e., the packets transferred between the nodes) is determined by the reading of the sensed data. That is, the dynamic counting sketch data structure gets longer as the reading gets greater, and vice versa. In addition, because the length of the dynamic counting sketch data structure is variable, the data length (i.e., the packet lengths) sent by the sensor modules at the same moment may be different from one another (since the readings of the sensed data sensed by the sensor modules may be different from one another), or the data lengths sent by the same sensing module in different cycles may be different from one another (since the readings of the sensed data sensed by the same sensing module in different cycles may be different from one another). In addition, the data structure broadcasted from the lower layer sensor modules may not include the identification code (ID) of the sensor module.

Second, in the above-mentioned embodiments, the sensed data to be aggregated is in form of the dynamic counting sketch data structure. Thus, even if some sensed data are repeatedly calculated, the final aggregated result will not be affected. As shown in FIGS. 6A to 6C, the sensed data whose readings is 3 is repeatedly aggregated, but the final result is not negatively affected and is still quite close to the sum of the originally sensed data.

Third, the privacy protection of the sensed data is improved. In the above-mentioned second embodiment, the sensed data subject protection may be dynamically and reliably protected based on the dynamic counting sketch data structure and the random number. In addition, the precision of the data aggregation may further be dynamically adjusted according to the precision requirement of the data aggregation specified by the user, and it is possible to completely or almost assure that the aggregation result on all the sensed data meet with the precision requirement required by the user. Thus, the privacy protection technology for the sensed data according to the embodiment of the present disclosure does work even without any security encrypting technology; the user will not worry the sensor module is hacked or not. In addition, the sensed data under privacy protection and the sensed data not under privacy protection may be aggregated together.

Fourth, the embodiments of the present disclosure may be completed by the development of the application layer. In the embodiments of the present disclosure, instead of improving and enhancing the hardware architecture or its communication protocol of the sensor module, improvement of the data aggregation computation is performed on the application layer, and thus irrelevant to the communication architecture used by the sensor module. That is, the technology of the embodiments is compatible with the existing or more advanced and reliable sensor communication protocol and hardware.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A wireless sensing system, comprising:
a data processing center;
a first sensor module for processing a first source data into
 a first dynamic counting sketch data structure, wherein the first dynamic counting sketch data structure has its bit length determined based on the first source data; and
a second sensor module for sensing a second source data, processing the second source data into a second dynamic counting sketch data structure and transferring the second dynamic counting sketch data structure to the first sensor module, wherein the second dynamic counting sketch data structure has its bit length determined based on the second source data;
wherein the data processing center estimates the first source data at least based on the first dynamic counting sketch data structure;
after the first sensor module receives the second dynamic counting sketch data structure, the first sensor module aggregates the first and the second dynamic counting sketch data structures into a third dynamic counting sketch data structure, and a final dynamic counting sketch data structure is generated module-by-module and sent to the data processing center;
the data processing center estimates the first source data, the second source data and other source data from other modules according to the received final dynamic counting sketch data structure; and
the first dynamic counting sketch data structure comprises a first border index and a first counting vector, the bit length of the first counting vector determined based on the first source data, and the first border index indicating the bit length of the first counting vector.

2. The system according to claim 1, wherein the first sensor module randomly and uniformly setting at most x bits 1 in the first counting vector, x being a reading of the first source data.

3. The system according to claim 2, wherein the bit length of the first dynamic counting sketch data structure relates to a error ratio, a confidence level, a data aggregation function and the number of sensing modules in the wireless sensing system.

4. The system according to claim 2, wherein:
the second dynamic counting sketch data structure comprises a second border index and a second counting vector;
a third border index of the third dynamic counting sketch data structure relates to a logic operation result on the first border index of the first dynamic counting sketch data structure and the second border index of the second dynamic counting sketch data structure; and
a third counting vector of the third dynamic counting sketch data structure relates to a logic operation result on the first counting vector of the first dynamic counting sketch data structure and the second counting vector of the second dynamic counting sketch data structure.

5. The system according to claim 4, wherein:
the data processing center estimates the first source data, the second source data and other source data from other modules according to a ratio of bit 0 in each zone of the final dynamic counting sketch data structure, the first border index, the second border index and other border indexes related other source data; and
estimation of the first source data, the second source data and other source data is not affected even if by an interruption of connection between the sensor modules.

6. The system according to claim 1, wherein the first sensor module randomly generates a first random number according to the first source data in response to a privacy protection requirement, and the first dynamic counting sketch data structure is obtained according to an operation result on the first random number and the first source data.

7. The system according to claim 6, wherein:
the first sensor module randomly and uniformly takes out the first random number from a [0,Vi] zone, wherein Vi is the first source data.

8. The system according to claim 7, wherein the bit length of the first dynamic counting sketch data structure further relates to the first random number.

9. A wireless sensing method applied to a wireless sensing system, the method comprising the steps of:
receiving a user instruction;
sensing a first source data and a second source data;
processing the first source data and the second source data into a first dynamic counting sketch data structure and a second dynamic counting sketch data structure, respectively, wherein respective bit length of the first dynamic counting sketch data structure and the second dynamic counting sketch data structure are determined based on the first and the second source data, respectively;
performing an in-network aggregation computation on the first and the second dynamic counting sketch data structures to generate a third dynamic counting sketch data structure;
generating a final dynamic counting sketch data structure layer by layer; and
estimating the first source data, the second source data and other source data related to other layers according to the final dynamic counting sketch data structure;
wherein the first dynamic counting sketch data structure comprises a first border index and a first counting vector, the bit length of the first counting vector determined based on the first source data, and the first border index indicating the bit length of the first counting vector.

10. The method according to claim 9, further comprising randomly and uniformly setting at most x logic 1 bits in the first counting vector, x being a reading of the first source data.

11. The method according to claim 9, wherein the bit length of the first dynamic counting sketch data structure relates to a error ratio, a confidence level, a data aggregation function and the number of sensing modules in the wireless sensing system.

12. The method according to claim 10, wherein the second dynamic counting sketch data structure comprises a second border index and a second counting vector, the third dynamic counting sketch data structure comprises a third border index and a third counting vector, and the step of aggregating the first and the second dynamic counting sketch data structures into the third dynamic counting sketch data structure comprises:
obtaining the third border index of the third dynamic counting sketch data structure according to a logic operation result on the first border index of the first dynamic counting sketch data structure and the second border index of the second dynamic counting sketch data structure; and
obtaining the third counting vector of the third dynamic counting sketch data structure according to a logic operation result on the first counting vector of the first dynamic counting sketch data structure and the second counting vector of the second dynamic counting sketch data structure.

13. The method according to claim 12, wherein the step of estimating the first source data, the second source data and other source data comprises:
estimating the first source data, the second source data and other source data according to a ratio of bit 0 in each zone of the final dynamic counting sketch data structure, the first border index and the second border index, wherein estimation of the first source data, the second source data and other source data are not affected by an interruption of transmitting the first source data, the second source data and other source data.

14. The method according to claim 9, further comprising the step of:
   randomly generating a first random number according to the first source data in response to a privacy protection requirement; and
   obtaining the first dynamic counting sketch data structure according to an operation result on the first random number and the first source data.

15. The method according to claim 14, further comprising the step of:
   randomly and uniformly taking out the first random number from a [0,Vi] zone, wherein Vi is the first source data.

16. The method according to claim 15, wherein the bit length of the first dynamic counting sketch data structure further relates to the first random number.

* * * * *